(12) United States Patent
Smit et al.

(10) Patent No.: US 9,419,440 B2
(45) Date of Patent: Aug. 16, 2016

(54) APPARATUS AND METHODS FOR BALANCED LOAD POINT AND PERMISSIVE CLOSE DETERMINATIONS FOR DISTRIBUTION FEEDERS

(71) Applicant: Siemens Industry, Inc., Alpharetta, GA (US)

(72) Inventors: Andre Smit, Raleigh, NC (US); Alexandr S. Stinskiy, Knightdale, NC (US)

(73) Assignee: Siemens Aktiengesellschaft, München (DE)

( * ) Notice: Subject to any disclaimer, the term of this patent is extended or adjusted under 35 U.S.C. 154(b) by 684 days.

(21) Appl. No.: 13/645,751

(22) Filed: Oct. 5, 2012

(65) Prior Publication Data
US 2013/0090775 A1 Apr. 11, 2013

Related U.S. Application Data

(60) Provisional application No. 61/543,840, filed on Oct. 6, 2011.

(51) Int. Cl.
| G06F 1/26 | (2006.01) |
| H02J 3/46 | (2006.01) |
| H02J 3/02 | (2006.01) |
| H02J 13/00 | (2006.01) |

(52) U.S. Cl.
CPC ... *H02J 3/46* (2013.01); *H02J 3/02* (2013.01); *H02J 13/0062* (2013.01); *H02J 13/0079* (2013.01); *Y02E 60/7838* (2013.01); *Y04S 40/124* (2013.01)

(58) Field of Classification Search
None
See application file for complete search history.

(56) References Cited

U.S. PATENT DOCUMENTS

| 7,751,166 B2 | 7/2010 | Colonna |
| 2011/0144931 A1 | 6/2011 | Smit |

FOREIGN PATENT DOCUMENTS

| CN | 101478168 A | 7/2009 |
| EP | 2273642 A2 | 1/2011 |
| WO | 2011018703 A2 | 2/2011 |
| WO | 2011134851 A1 | 11/2011 |

OTHER PUBLICATIONS

Depablos, Juancarlo, "Internet Peer-to-Peer communication based Recloser and Sectionalizer Protection Scheme", Virginia Tech Polytechnic Institute, 2003.*
PCT International Search Report mailed Feb. 26, 2014 corresponding to PCT International Application No. PCT/US2012/059173 filed Oct. 8, 2012 (13 pages).
Translation of Chinese Office Action mailed Dec. 29, 2015 corresponding to Chinese Application No. 201280049087.0 filed Oct. 8, 2012 (37 pages).

* cited by examiner

*Primary Examiner* — Carlos Ortiz Rodriguez

(57) ABSTRACT

Balanced load points and permissive close switch determinations may be made using a decentralized peer-to-peer methodology for a distribution feeder that includes switches and line sections between adjacent switches, each switch being a switching point of the distribution feeder. In particular, a balanced load point may be determined by determining a first load at a first switch and a second load at a second switch coupled to the first switch via a first line section, communicating the first load and a first load budget from the first switch to the second switch, determining a third load on the first line section based on the first load and the second load, and determining a second load budget at the second switch based on the first load budget and the third load, all substantially in real time.

20 Claims, 8 Drawing Sheets

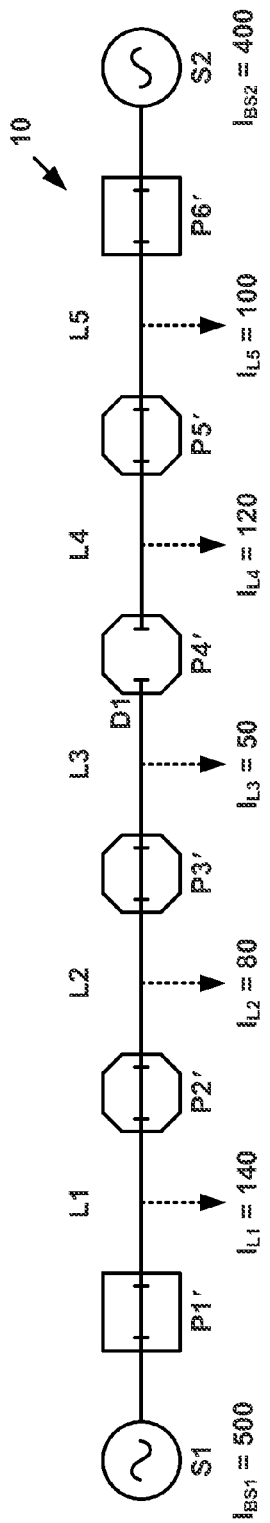
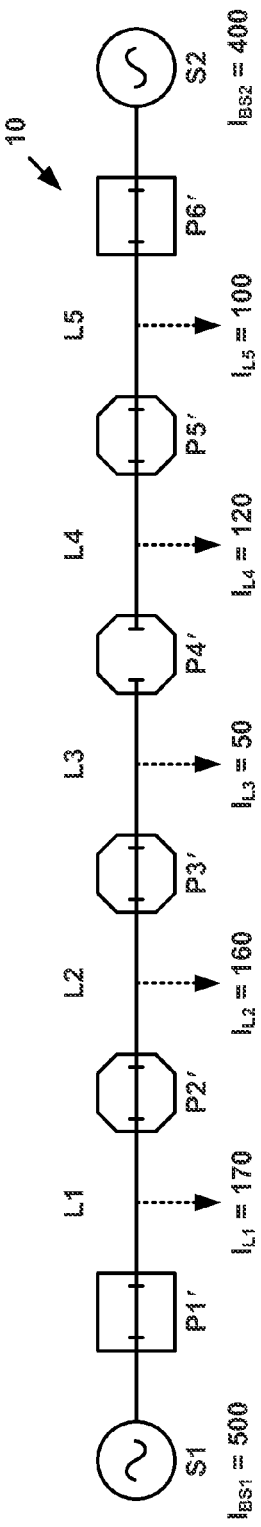
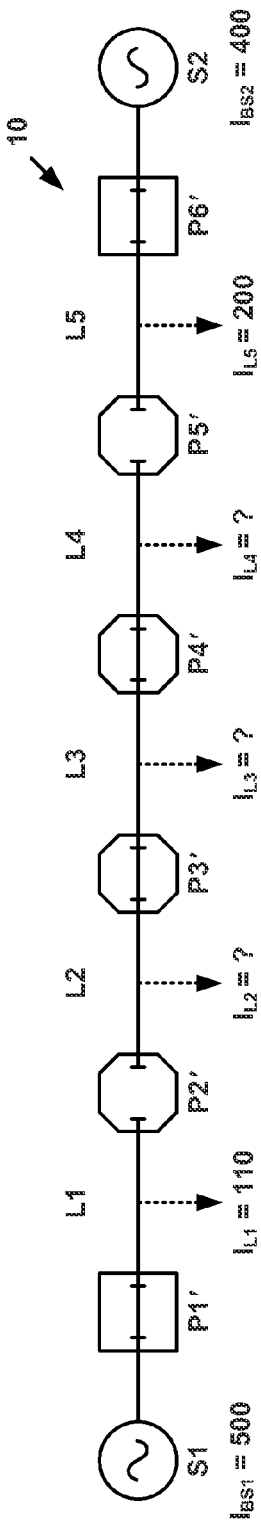
FIG. 1A (PRIOR ART)
FIG. 1B (PRIOR ART)
FIG. 1C (PRIOR ART)

APPARATUS AND METHODS FOR BALANCED LOAD POINT AND PERMISSIVE CLOSE DETERMINATIONS FOR DISTRIBUTION FEEDERS

REFERENCE TO RELATED APPLICATIONS

This application claims the benefit of U.S. Provisional Patent Application Ser. No. 61/543,840, filed Oct. 6, 2011, which is incorporated by reference herein in its entirety for all purposes.

BACKGROUND

This invention relates to distribution feeders. More particularly, this invention relates to apparatus and methods for balanced load point and permissive close determinations for distribution feeders.

SUMMARY

In a first aspect of the invention, a method is provided for use with a distribution feeder that includes switches and line sections between adjacent switches, each switch being a switching point of the distribution feeder. The methods include determining a first load at a first switch and a second load at a second switch coupled to the first switch via a first line section, communicating the first load and a first load budget from the first switch to the second switch, determining a third load on the first line section based on the first load and the second load, and determining a second load budget at the second switch based on the first load budget and the third load, all substantially in real time.

In a second aspect of the invention, a method is provided for use with a distribution feeder that includes switches and line sections between adjacent switches, each switch being a switching point of the distribution feeder. The method includes determining a first load at a first switch, communicating the first load and a first load budget from the first switch to a second switch coupled to the first switch via a first line section, wherein the second switch is an open point of the distribution feeder, determining a second load on the first line section between based on the first load, determining a second load budget at the second switch based on the first load budget and the second load, determining a third load at a third switch coupled to the second switch via a second line section, communicating the third load from the third switch to the second switch, and determining a fourth load at the second switch based on the third load and a maximum load of the second line section, all performed substantially in real time.

In a third aspect of the invention, a distribution feeder is provided that includes switches and line sections between adjacent switches, each switch including a switching point of the distribution feeder. The distribution feeder further includes a first switch having a first processor and a second switch coupled to the first switch via a first line section, the second switch having a second processor. The first processor determines a first load at the first switch, and communicates the first load and a first load budget to the second switch. The second processor determines a second load at the second switch, determines a third load on the first line section based on the first load and the second load, and determines a second load budget based on the first load budget and the third load. The first processor and second processor perform these steps substantially in real time.

Other features and aspects of the present invention will become more fully apparent from the following detailed description, the appended claims and the accompanying drawings.

BRIEF DESCRIPTION OF THE DRAWINGS

Features of the present invention can be more clearly understood from the following detailed description considered in conjunction with the following drawings, in which the same reference numerals denote the same elements throughout, and in which:

FIGS. 1A-1C are diagrams of a previously known distribution feeder at first, second and third time instant;

DETAILED DESCRIPTION

Figure 2A:
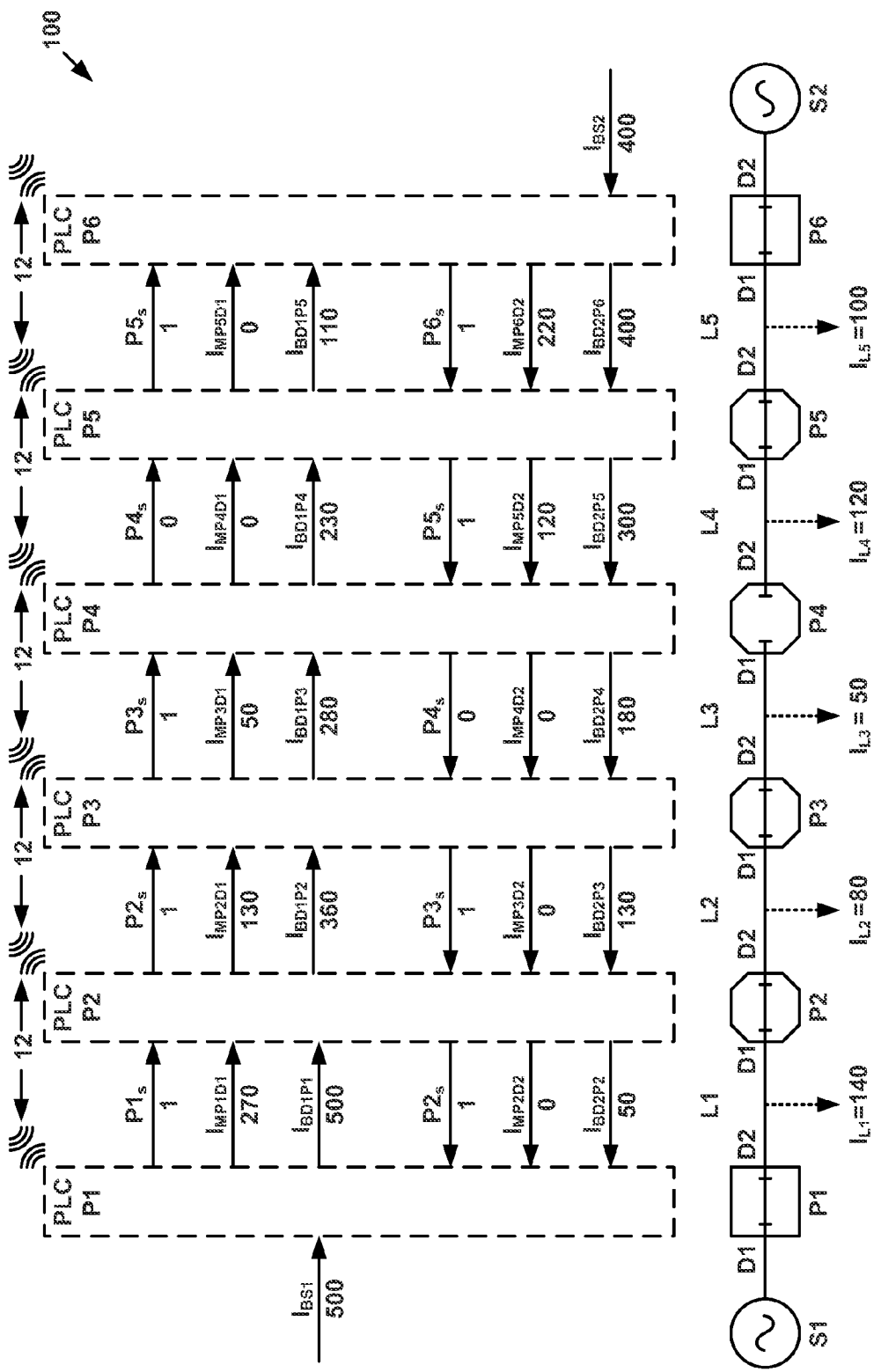
FIG. 2A is a diagram of an example distribution feeder in accordance with this invention at a first time instant.

Referring now to FIGS. 1A-1C, a previously known distribution feeder 10 is described. Distribution feeder 10 includes a first circuit breaker P1', a second circuit breaker P6', and reclosers/switches P2'-P5' (for simplicity, reclosers and switches will be referred to herein as switches) and line sections L1-L5 coupled between first circuit breaker P1' and second circuit breaker P6'. First circuit breaker P1' is coupled to a first source (e.g., an electrical substation) S1, which may supply a maximum load of 500 A, and second circuit breaker P6' is coupled to second source (e.g., an electrical substation) S2, which may supply a maximum load of 400 A.

Line section L1 is coupled between first circuit breaker P1' and switch P2', line section L2 is coupled between switch P2' and switch P3', line section L3 is coupled between switch P3' and switch P4', line section L4 is coupled between switch P4' and switch P5', and line section L5 is coupled between switch P5' and second circuit breaker P6'.

Under the control of a system operator, first circuit breaker P1', second circuit breaker P6' and switches P2'-P5' each may be individually opened or closed. In the example depicted in FIG. 1A, first circuit breaker P1', second circuit breaker P6', switches P2'-P3' and P5' are closed, and switch P4' is open, and is referred to herein as an open point in distribution feeder 10.

As a result of load variations over time, the system operator frequently may determine a "balanced load point" of the distribution feeder, and may move the open point by changing the open and closed status of one or more of first circuit breaker P1', second circuit breaker P6' and switches P2'-P5' to balance the loading between first source S1 and second source S2.

For example, referring now to FIG. 1A, at a first time instant t0, first and second circuit breakers P1' and P6', and switches P1'-P3' and P5' are all closed, and switch P4' is open. Thus, first source S1 supplies line sections L1-L3, and second source S2 supplies line sections L4-L5. At first time instant t0, line sections L1-L5 have the following instantaneous loading:

TABLE 1

Loading at Time Instant t0

| Line Section | Load (Amps) |
|---|---|
| L1 | 140 |
| L2 | 80 |
| L3 | 50 |
| L4 | 120 |
| L5 | 100 |

In the configuration shown in FIG. 1A, first source S1 supplies a total load of 270 A to line sections L1-L3, and second source S2 supplies a total load of 220 A to line sections L4-L5. In this regard, the loading of line sections L1-L5 may be considered balanced between first source S1 and second source S2, and switch P4' is a "balance load point" of distribution feeder 10. Persons of ordinary skill in the art will understand that balanced loading in a distribution feeder does not require exactly equal loading on either side of an open point. Instead, a distribution feeder is considered "balanced" if the line section loading for all line sections to the left of the open point and the right of the open point is proportionally loaded to sources to the left and right of the open point, respectively.

Because the load on a distribution feeder continually changes occur over time, distribution feeder 10 may no longer be balanced, and switch P4' may not remain the balance load point of distribution feeder 10. For example, referring now to FIG. 1B, at a second time instant t1, the configuration of first and second circuit breakers P1' and P6', and switches P1'-P5' all remain the same as in FIG. 1A. However, the loading of line sections L1-L5 has changed to the following:

TABLE 2

Loading at Time Instant t1

| Line Section | Load (Amps) |
|---|---|
| L1 | 170 |
| L2 | 160 |
| L3 | 50 |
| L4 | 120 |
| L5 | 100 |

That is, the loading on line section L1 has increased to 170 A, and the loading on line section L2 has increased to 160 A. Thus, at time instant t1, first source S1 supplies a total load of 380 A to line sections L1-L3, and second source S2 supplies a total load of 220 A to line sections L4-L5. In this regard, as a result of load variations, the loading may no longer be balanced between first source S1 and second source S2, and switch P4' may no loner be the balance load point of distribution feeder 10.

Thus, as the loading of line sections L1-L5 changes over time, a system operator must continually determine the balance load point of the distribution feeder by continually determining the loading of line sections L1-L5. If the balanced load point shifts, the operator must reconfigure first and second circuit breakers P1' and P6', and switches P1'-P5'. For example, if the balanced load point in FIG. 1B is switch P2', the operator may rebalance distribution feeder 10 by opening switch P2' and closing switch P4'.

In addition, during a system outage (e.g., as a result of a downed power line during a storm, routine repairs, etc.), one or more of first circuit breaker P1', second circuit breaker P6' and switches P2'-P5' may be opened to disconnect one or more line sections L1-L5 from first source S1 and/or second source S2. After the system outage has been remedied, the system operator may close one or more of first circuit breaker P1', second circuit breaker P6' and switches P2'-P5' to reconnect one or more of the previously disconnected line sections L1-L5. To avoid damage that may result from overloading first source S1 or second source S2, the operator should close a circuit breaker or switch only if the available load from a source exceeds the load to be connected to the source.

For example, referring now to FIG. 1C, at a third time instant t2, following a disruption to distribution feeder 10, first circuit breaker P1', second circuit breaker P6', and switches P3'-P5' are closed, but switches P2' and P5' are open, and line sections L2-L4 are disconnected from first source S1 and second source S2.

After the disruption has been corrected, the system operator may reconnect line sections L2-L4 either by closing open point P2' to connect first source S1 to line sections L2-L4, or by closing open point P5' to connect second source S2 to line sections L2 L4. Before closing switch P2' or switch P5', the system operator must first determine the loading that line sections L2-L4 may place on distribution feeder 10. However, because line sections L2-L4 have been offline, the system operator does not know the loading requirements of line sections L2-L4 upon reconnection.

Previously known distribution feeder systems typically use a centralized approach to calculate system loading to determine balanced load points, and available load at open points to allow closure of circuit breakers or switches. In one such system, the circuit breakers and switches measure currents and/or voltages to determine instantaneous loading, and then communicate the measured loading data to a centralized locations for processing.

As a result of long delays to acquire measured data at the centralized location from the feeders via various communication networks, plus the time required for calculations and decision making, these previously known systems are slow to react. Indeed, in some instances, by the time that a decision has been made to rebalance the system, the loading and system topology has already changed such that the decision is obsolete. Some previously known systems perform this function faster using quasi peer-to-peer communication. These systems are based on proprietary communication protocols, however, with limited switching points per feeder.

Some previously known centralized systems use estimators based on previously gathered historical loading data to statistically predict the required feeder topology for a balanced system. However, the estimation of current loads based on historical data is rather difficult due the random nature of loading on a distribution feeder. In addition, complex statistical calculations are required to determine a balanced load point on a distribution feeder.

In addition, previously known centralized systems also are costly, because measurement and control devices must be installed to gather the load data, a communication system must be deployed to transport the data, and an additional centralized PC or powerful server is required with costly software to calculate and estimate the required load balance configurations and/or feeder topologies. In addition, costly IT services are required to maintain the equipment and software. Further, the complexity of statistical estimation takes time to gather the data to predict the possible load conditions.

In accordance with an example embodiment of this invention, apparatus and methods use a decentralized peer-to-peer methodology to determine a balanced load point for a distribution feeder. In addition, in accordance with another example embodiment of this invention, apparatus and methods use a decentralized peer-to-peer methodology to generate a "permissive close signal" that allow closure of a circuit breaker or switch if the available load from a source is greater than or equal to the load to be connected.

Balanced Load Point Determination

Referring now to FIGS. 2A-2E, an example distribution feeder in accordance with this invention is described. In particular, referring to FIG. 2A, distribution feeder 100 includes a first circuit breaker P1, switches P2-P5, a second circuit breaker P6, and line sections L1-L5 coupled between first circuit breaker P1 and second circuit breaker P6. First circuit breaker P1 is coupled to a first source (e.g., an electrical substation) S1, and second circuit breaker P6 is coupled to second source (e.g., an electrical substation) S2, FIG. 2A illustrates the configuration of distribution feeder 100 at a first time instant t0. As described in more detail below, FIGS. 2B-2E illustrate the configuration of distribution feeder 100 at subsequent time instants.

Line section L1 is coupled between first circuit breaker P1 and switch P2, line section L2 is coupled between switch P2 and switch P3, line section L3 is coupled between switch P3 and switch P4, line section L4 is coupled between switch P4 and switch P5, and line section L5 is coupled between switch P5 and second circuit breaker P6. Persons of ordinary skill in the art will understand that distribution feeders in accordance with this invention may have configurations other than as shown in FIG. 2A.

First circuit breaker P1, switches P2-P5, and second circuit breaker P6 each include a processor (sometimes referred to as an intelligent electronic device "IED"), such as a programmable logic controller ("PLC") or other similar processor, that complies with the International Electrotechnical Commission ("IEC") 61850 reference architecture for electric power systems. For example, as shown in FIG. 2A, first circuit breaker P1 includes PLC P1, switches P2-P5 include PLC P2-PLC P5, respectively, and second circuit breaker P6 includes PLC P6.

First circuit breaker P1, switches P2-P5, and second circuit breaker P6 may communicate with one another using peer-to-peer communication via a communication network 12, such as a fiber optic link, WiMax, WiFi, or other similar wired or wireless communication network, or combination of such communication networks. In this regard, first circuit breaker P1, switches P2-P5, and second circuit breaker P6 are also referred to herein as "peers."

Peers P1-P6 may communicate with one another using Generic Object Oriented Substation Event ("GOOSE") messages in accordance with the IEC 61850 standard. As is known, GOOSE messages may be used to communicate analog and digital data. Persons of ordinary skill in the art will understand that peers P1-P6 alternatively may communicate using other message types, protocols and formats.

As illustrated in FIG. 2A, data communicated between peers P1-P6 using GOOSE messages are depicted using single-headed arrows. Thus, for example, peer P1 communicates data $P1_s$, $I_{MP1D1}$ and $I_{BD1P1}$ (having values 1, 270 and 500, respectively, and described in more detail below) to peer P2 using GOOSE messages. Likewise, peer P5 communicates data $P5_s$, $I_{MP5D2}$ and $I_{BD2P5}$ (having values 1, 120 and 300, respectively, and described in more detail below) to peer P4, and also communicates data $P5_s$, $I_{MP5D1}$ and $I_{BD1P5}$ (having values 1, 0 and 110, respectively, and described in more detail below) to peer P6 using GOOSE messages.

First source S1 has a maximum load budget $I_{BS1}$, and second source S2 has a maximum load $I_{BS2}$. In accordance with this invention, $I_{BS1}$ is set to a maximum load of first circuit breaker P1 (e.g., 500 A), and $I_{BS1}$ is set to a maximum load of second circuit breaker P6 (e.g., 400 A). Persons of ordinary skill in the art will understand that loads and load budgets may be specified in units of current, voltage, power or other similar measurement units. For simplicity, the remaining discussion will refer to load and load budgets in units of current.

Persons of ordinary skill in the art will understand that distribution feeders in accordance with this invention may include more or less than two circuit breakers P1 and P6, more or less than five switches S1-S5, and more or less than two sources S1 and S2. In addition, persons of ordinary skill in the art will understand that first source S1 may have a load budget. $I_{BS1}$ that is greater or less than 500 A, and may be a variable value, and second source S2 may have a load budget $I_{BS2}$ that is greater or less than 400 A, and may be a variable value.

Peers P1-P6 each have a first direction D1 and a second direction D2. In the example shown in FIG. 2A, first direction D1 is in the direction towards first source S1, and second direction D2 is in the direction towards second source S2.

In addition, peers P1-P6 each have a corresponding status indicator $P1_s$-$P6_s$, respectively, that indicates whether the peer is open or closed. For example, as shown in FIG. 2A, status indicators $P1_s$-$P6_s$ each having a value of 0 for open, or 1 for closes. Persons of ordinary skill in the art will understand that status indicators $P1_s$-$P6_s$ alternatively may have values other than 0 or 1 to indicate the open and closed status of peers P1-P6.

As shown in FIG. 2A, at time instant t0, first circuit breaker P1, switches P2-P3 and P5, and second circuit breaker P6 are closed ($P1_s$-$P3_s$ $P5_s$-$P6_s$=1), and switch P4 is open ($P4_s$=1). Thus, line sections L1-L3 receive power from source S1 from first direction D1, and line sections L4-L5 receive power from second source S2 from second direction D2.

In accordance with an example embodiment of this invention, peers P1-P6 use a decentralized approach to determine a balanced load point in distribution feeder 100 by determining substantially real time loading and remaining load budgets at each switching point in distribution feeder 100, and by communicating the measured load and calculated remaining load budgets to adjacent peers in distribution feeder 100, such as by using GOOSE messages or other similar messages.

In particular, peers P1-P6 determine a balance point in distribution feeder 100 by: (1) measuring the real time load at their respective switching points in distribution feeder 100, (2) calculating the real time loads of line sections L1-L5, (3) calculating the remaining real time load budget from first source S1 in first direction D1 and the remaining real time load budget from second source S2 in second direction D2, (4) comparing the calculated remaining real time load budgets from first source S1 and second source S2 in first direction D1 and second direction D2, (5) determining the desired source for each adjacent line section in first direction D1 and second direction D2 based on the comparison results, and (6) determining the balanced load point in distribution feeder 100 based on the comparison results. Each of these will be described in turn.

1. Measuring Real Time Loads

Peers P1-P5 each measure the real time load in first direction D1 ("measured real time D1 loads"), and communicate the measured real time D1 loads to their adjacent peers in second direction D2 using GOOSE messages. In addition, peers P2-P6 each measure the real time load in second direction D2 ("measured real time D2 loads"), and communicate the measured real time D2 loads to their adjacent peers in first direction D1 using GOOSE messages.

For example, as shown in FIG. 2A, the measured real time 111 loads at each of peers P1-P5 in are:

TABLE 3

Measured Real Time Loads in D1 at t0

| Peer | Parameter | Load (Amps) |
|---|---|---|
| P1 | $I_{MP1D1}$ | 270 |
| P2 | $I_{MP2D1}$ | 130 |
| P3 | $I_{MP3D1}$ | 50 |
| P4 | $I_{MP4D1}$ | 0 |
| P5 | $I_{MP5D1}$ | 0 |

Because switch P4 is OPEN, no power from first source S1 flows in first direction D1 from peers P4 or P5. Thus, $I_{MP4D1}$ and $I_{MP5D1}$ both=0. As illustrated in FIG. 2A, peers P1-P5 each communicate measured real time D1 loads, $I_{MP1D1}$-$I_{MP5D1}$, respectively, to adjacent peers in second direction D2 (P2-P6, respectively) using GOOSE messages.

Likewise, as shown in FIG. 2A, the measured real time D2 loads at each of peers P2-P6 are:

TABLE 4

Measured Real Time Loads in D2 at t0

| Peer | Parameter | Load (Amps) |
|---|---|---|
| P2 | $I_{MP2D2}$ | 0 |
| P3 | $I_{MP3D2}$ | 0 |
| P4 | $I_{MP4D2}$ | 0 |
| P5 | $I_{MP5D2}$ | 120 |
| P6 | $I_{MP6D2}$ | 220 |

Because switch P4 is OPEN, no power from second source S2 flows in second direction D2 from peers P2-P3. Thus, $I_{MP2D2}$, $I_{MP3D2}$ and $I_{MP4D2}$ all=0. As illustrated in FIG. 2A, peers P2-P6 each communicate measured real time D2 loads, $I_{MP1D2}$-$I_{MP6D2}$, respectively, to adjacent peers in first direction D1 (P1-P5, respectively) using GOOSE messages.

2. Calculating Real Time Line Section Loads

Peers P1-P6 calculate the real time loads in line sections L1-L5. based on the measured real time D1 loads, $I_{MP1D1}$-$I_{MP5D1}$ and the measured real time D2 loads, $I_{MP1D2}$-$I_{MP6D2}$. In particular, if a line section is supplied from first direction D1 by first source S1, the real time line section load is calculated using the measured real time D1 loads, $I_{MP1D1}$-$I_{MP5D1}$, and if a line section is supplied from second direction D2 by second source S2, the real time line section load is calculated using the real time D2 loads, $I_{MP1D2}$-$I_{MP6D2}$.

For line sections L1-L5, the calculated real time line section loads $I_{L1}$-$I_{L5}$, respectively, are:

TABLE 5

Real Time Line Section Loads at t0

| Line Section | Parameter | Calculation | Load (Amps) |
|---|---|---|---|
| L1 | $I_{L1}$ | $|I_{MP1D1} - I_{MP2D1}|$ | 140 |
| L2 | $I_{L2}$ | $|I_{MP2D1} - I_{MP3D1}|$ | 80 |
| L3 | $I_{L3}$ | $|I_{MP3D1} - I_{MP4D1}|$ | 50 |
| L4 | $I_{L4}$ | $|I_{MP5D2} - I_{MP4D2}|$ | 120 |
| L5 | $I_{L5}$ | $|I_{MP6D2} - I_{MP5D2}|$ | 100 |

That is, because line sections L1-L3 are supplied from first direction D1 by first source S1, the real time line section loads $I_{L1}$-$I_{L3}$ are calculated using the measured real time D1 loads, $I_{MP1D1}$-$I_{MP4D1}$. Likewise, because line sections L4-L5 are supplied from second direction D2 by second source S2, the real time line section loads $I_{L4}$-$I_{L5}$ are calculated using the measured real time D2 loads, $I_{MP4D2}$-$I_{MP6D2}$.

3. Calculating Remaining Real Time Load Budgets

Peers P1-P5 each calculate the remaining real time load budget from first source S1 in first direction D1 based on the calculated real time line section loads $I_{L1}$-$I_{L5}$, and communicate the calculated values to their adjacent peers in second direction D2 using GOOSE messages. In addition, peers P2-P6 each calculate the remaining real time load budget from second source S2 in second direction D2 based on the calculated real time line section loads $I_{L1}$-$I_{L5}$, and communicate the calculated values to their adjacent peers in first direction D1 using GOOSE messages. For purposes of the remaining real time load budget calculations, each peer assumes that all peers P1-P6 are CLOSED.

For peers P1-P5, the calculated remaining real time load budgets from first source S1 in first direction D1, $I_{BD1P1}$-$I_{BD1P5}$, respectively, are:

TABLE 6

Remaining Real Time Load Budgets in D1 at t0

| Parameter | Calculation | Value (Amps) |
|---|---|---|
| $I_{BD1P1}$ | $I_{BS1}$ | 500 |
| $I_{BD1P2}$ | $I_{BD1P1} - I_{L1}$ | 360 |
| $I_{BD1P3}$ | $I_{BD1P2} - I_{L2}$ | 280 |
| $I_{BD1P4}$ | $I_{BD1P3} - I_{L3}$ | 230 |
| $I_{BD1P5}$ | $I_{BD1P4} - I_{L4}$ | 110 |

As illustrated in FIG. 2A, peers P1-P5 each communicate the calculated remaining real time load budgets, $I_{BD1P1}$-$I_{BD1P5}$ respectively, to adjacent peers an second direction D2 (P2-P6, respectively) using GOOSE message.

For peers P6-P6, the calculated remaining real time load budgets from second source S2 in second direction D2, $I_{BD2P6}$-$I_{BD2P2}$, respectively, are:

TABLE 7

Remaining Real Time Load Budgets in D2 at t0

| Parameter | Calculation | Value (Amps) |
|---|---|---|
| $I_{BD2P6}$ | $I_{BS2}$ | 400 |
| $I_{BD2P5}$ | $I_{BD1P1} - I_{L5}$ | 300 |
| $I_{BD2P4}$ | $I_{BD2P2} - I_{L4}$ | 180 |
| $I_{BD2P3}$ | $I_{BD2P3} - I_{L3}$ | 130 |
| $I_{BD2P2}$ | $I_{BD2P4} - I_{L2}$ | 50 |

As illustrated in FIG. 2A, peers P6-P2 each communicate the calculated remaining real time load budgets, $I_{BD2P6}$-$I_{BD2P2}$, respectively, to adjacent peers in first direction D1 (P5-P1, respectively) using GOOSE messages.

4. Comparing Calculated Remaining Load Budgets

In example distribution feeder 100 of FIG. 2A, only switches P2-P5 can be balanced load points (if either first circuit breaker P1 or second circuit breaker P2 were a balanced load point, then first source S1- or second source S2 would be disconnected from distribution feeder 100) Thus, each of switches P2-P5 compares the calculated remaining real time load budgets from first source S1 and second source S2 in first direction D1 to determine which calculated remaining real time load budget is greater, and compares the calculated remaining real time load budgets from first source S1 and second source S2 in second direction D2 to determine which calculated remaining real time load budget is greater.

For peers P2-P5, the compared remaining real time load budgets and comparison results are:

TABLE 8

Real Time Load Budget Comparisons at t0

| Peer | D1 Comparison | Result | D2 Comparison | Result |
|------|---------------|--------|---------------|--------|
| P2 | $I_{BD1P1}$ and $I_{BD2P2}$ | $I_{BD1P1}$ | $I_{BD1P2}$ and $I_{BD2P3}$ | $I_{BD1P2}$ |
| P3 | $I_{BD1P2}$ and $I_{BD2P3}$ | $I_{BD1P2}$ | $I_{BD1P3}$ and $I_{BD2P4}$ | $I_{BD1P3}$ |
| P4 | $I_{BD1P3}$ and $I_{BD2P4}$ | $I_{BD1P3}$ | $I_{BD1P4}$ and $I_{BD2P5}$ | $I_{BD2P5}$ |
| P5 | $I_{BD1P4}$ and $I_{BD2P5}$ | $I_{BD2P5}$ | $I_{BD1P5}$ and $I_{BD2P6}$ | $I_{BD2P6}$ |

5. Determining Desired Source for Line Sections

Each of peers P2-P5 determines the desired source for each adjacent line section in first direction D1 and second direction D2 as the source having the larger remaining real-time load budget, as follows:

Peer 2: For first direction D1, peer P2 compares $I_{BD1P1}$ (500 A) and $I_{BD2P2}$ (50 A), and determines that $I_{BD1P1}$ is greater than $I_{BD2P2}$. Because the remaining load budget from first source S1 exceeds the remaining load budget from second source S2, peer 2 determines that first source S1 should supply line section L1 For second direction D2, peer P2 compares $I_{BD1P2}$ (360 A) and $I_{BD2P3}$ (130 A), and determines that $I_{BD1P2}$ is greater than $I_{BD2P3}$. Because the remaining load budget from first source S1 exceeds the remaining load budget from second source S2, peer 2 determines that first source S1 should supply line section L2.

Peer 3: or first direction D1, peer P3 compares $I_{BD1P2}$ (360 A) and $I_{BD2P3}$ (130 A), and determines that $I_{BD1P2}$ is greater than $I_{BD2P3}$. Because the remaining load budget from first source S1 exceeds the remaining load budget from second source S2, peer 3 determines that first source S1 should supply line section L2. For second direction D2, peer P3 compares $I_{BD1P3}$ (280 A) and $I_{BD2P4}$ (180 A), and determines that $I_{BD1P3}$ is greater than $I_{BD2P4}$. Because the remaining load budget from first source S1 exceeds the remaining load budget from second source S2, peer 3 determines that first source S1 should supply line section L3.

Peer 4: For first direction D1, peer P4 compares $I_{BD1P3}$ (280 A) and $I_{BD2P4}$ (180 A), and determines that $I_{BD1P3}$ is greater than $I_{BD2P4}$. Because the remaining load budget from first source S1 exceeds the remaining load budget from second source S2, peer 4 determines that first source S1 should supply line section L3. For second direction D2, peer P4 compares $I_{BD1P4}$ (230 A) and $I_{BD2P5}$ (300 A), and determines that $T_{BD2P5}$ is greater than $I_{BD1P4}$. Because the remaining load budget from second source S2 exceeds the remaining load budget from first source S1, peer 4 determines that second source S2 should supply line section L4.

Peer 5: For first direction D1, peer P5 compares $I_{BD1P4}$ (230 A) and $I_{BD2P5}$ (300 A), and determines that $I_{BD2P5}$ is greater than $I_{BD1P4}$. Because the remaining load budget from second source S2 exceeds the remaining load budget from first source S1, peer 5 determines that second source S2 should supply line section L4 For second direction D2, peer P5 compares $I_{BD1P5}$ (110 A) and $I_{BD2P6}$ (400 A), and determines that $I_{BD2P6}$ is greater than $I_{BD1P5}$. Because the remaining load budget from second source S2 exceeds the remaining load budget from first source S1, peer 5 determines that second source S2 should supply line section L5.

The following Table 9 summarizes the results:

TABLE 9

Determined Line Section Source at t0

| Peer | D1 Line Section | Desired Source in D1 | D2 Line Section | Desired Source in D2 |
|------|-----------------|----------------------|-----------------|----------------------|
| P2 | L1 | S1 | L2 | S1 |
| P3 | L2 | S1 | L3 | S1 |
| P4 | L3 | S1 | L4 | S2 |
| P5 | L4 | S2 | L5 | S2 |

6. Determining The Balanced Load Point

The balanced load point is the peer at which the desired source in first direction D1 is first source S1, and the desired source in second direction D2 is second source S2. Stated another way, the balanced load point is the peer at which the remaining load budget from first source S1 exceeds the remaining load budget from second source S2 in first direction D1, and the remaining load budget from second source S2 exceeds the remaining load budget from first source S1 in second direction D2.

As shown in Table 9, above, switch P4 is the peer at which the desired source in first direction D1 is first source S1, and the desired source in second direction D2 is second source S2. In addition, as shown in Table 8, above, switch P4 is the peer at which the remaining load budget from first source S1 ($I_{BD1P3}$=280 A) exceeds the remaining load budget from second source S2 ($I_{BD2P4}$=180 A) in first direction D1 and, and the remaining load budget from second source S2 ($I_{BD2P5}$=300 A) exceeds the remaining load budget from first source S1 ($I_{BD1P4}$=230 A) in second direction D2. Thus, the balanced load point at t0 is peer P4. Because the determined balanced load point P4 is the same as the open point P4, distribution feeder 100 is balanced, and the system operator does not need to make any changes to distribution feeder 100.

As described above, the real time loads in a distribution feeder continually change over time, and the balanced load point may therefore change as a result of changes in real time loads. For example, referring now to FIG. 2B, the configuration of distribution feeder 10 at a second time instant t1>t0 is described. In particular, measured real time D1 loads $I_{MP1D1}$ and $I_{MP2D1}$ have increased to 380 A and 210 A, respectively, but all other measured real time D1 loads and measured real time D2 loads are unchanged.

Following the same techniques described above, peers P1-P5 each measure the real time D1 loads, peers P2-P6 each measure the real time D2 loads, peers P1-P6 calculate the real time line section loads $I_{L1}$-$I_{L5}$, peers P1-P each calculate the remaining real time load budget from first source S1 in first direction D1 based on $I_{L1}$-$I_{L5}$, peers P2-P6 each calculate the remaining real time load budget from second source S2 in second direction D2 based on $I_{L1}$-$I_{L5}$, and the peers communicate the measured and calculated values to adjacent peers using GOOSE messages.

Figure 2B:
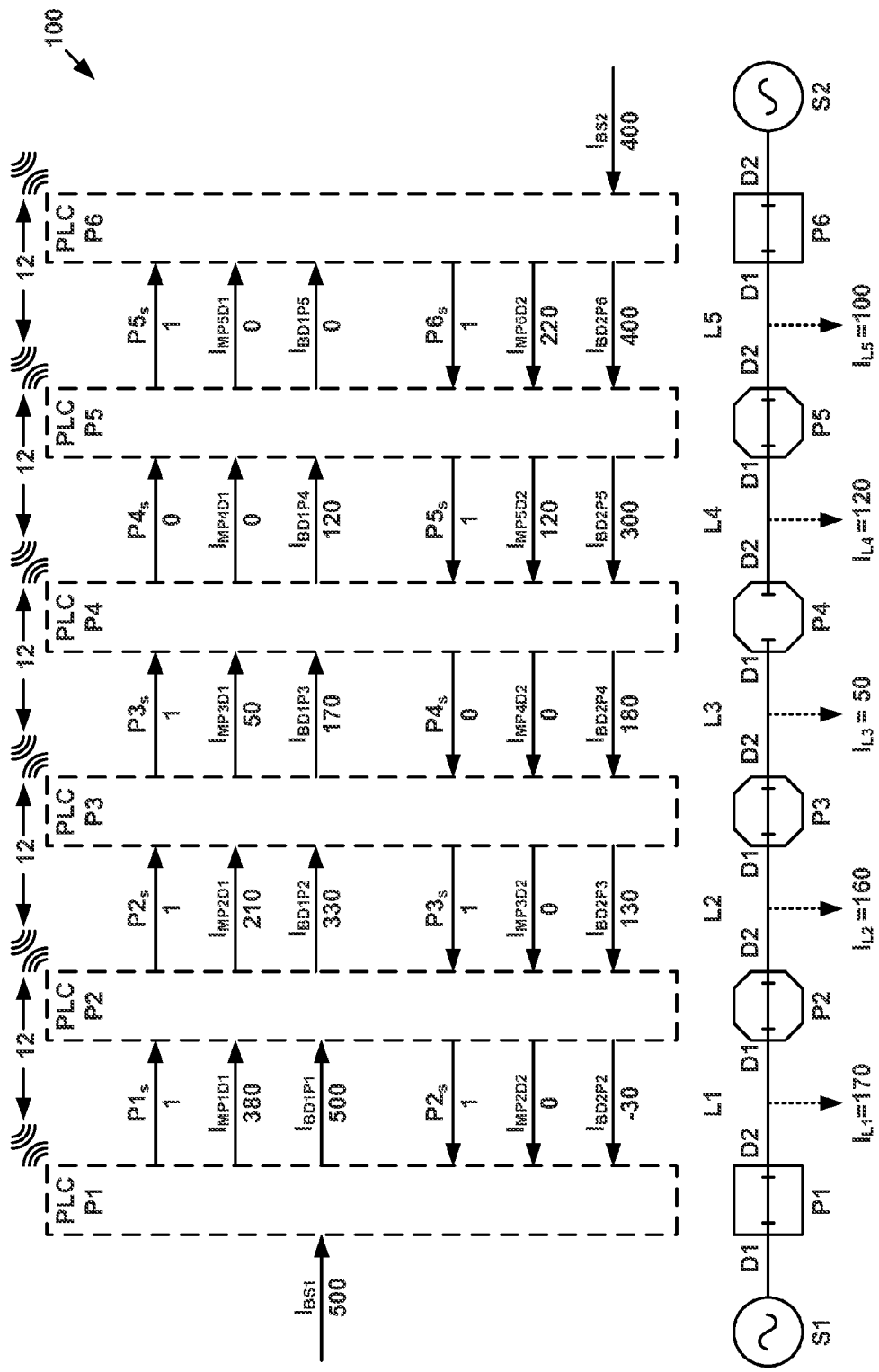
FIG. 2B is a diagram of the example distribution feeder of FIG. 2A at a second time instant.

As shown in FIG. 2B, the real time line section loads $I_{L1}$ and $I_{L2}$ have increased to 170 A and 160 A, respectively but all other real time line section loads remain the same. In addition, the remaining real time load budgets in D1 and D2 are:

TABLE 10

Remaining Real Time Load Budgets at t1

| $I_{BD1P1}$ | $I_{BD1P2}$ | $I_{BD1P3}$ | $I_{BD1P4}$ | $I_{BD1P5}$ |
|---|---|---|---|---|
| 500A | 330A | 170A | 120A | 0A |
| $I_{BD2P2}$ | $I_{BD2P3}$ | $I_{BD2P4}$ | $I_{BD2P5}$ | $I_{BD2P6}$ |
| −30A | 130A | 180A | 300A | 400A |

Peers P2-P5 each compares the calculated remaining real time load budgets from first source S1 and second source S2 in first direction 1 to determine which calculated remaining real time load budget is greater, and compares the calculated remaining real time load budgets from first source S1 and second source S2 in second direction D2 to determine which calculated remaining real time load budget is greater. Peer 3 is determined as the balanced load point: the remaining load budget from first source S1 ($I_{BD1P2}$=330 A) exceeds the remaining load budget from second source S2 ($I_{BD2P3}$=130 A) in first direction D1, and the remaining load budget from second source S2 ($I_{BD2P4}$=180) exceeds the remaining load budget from first source S1 ($I_{BD1P3}$=170 A) in second direction D2.

Figure 2C:
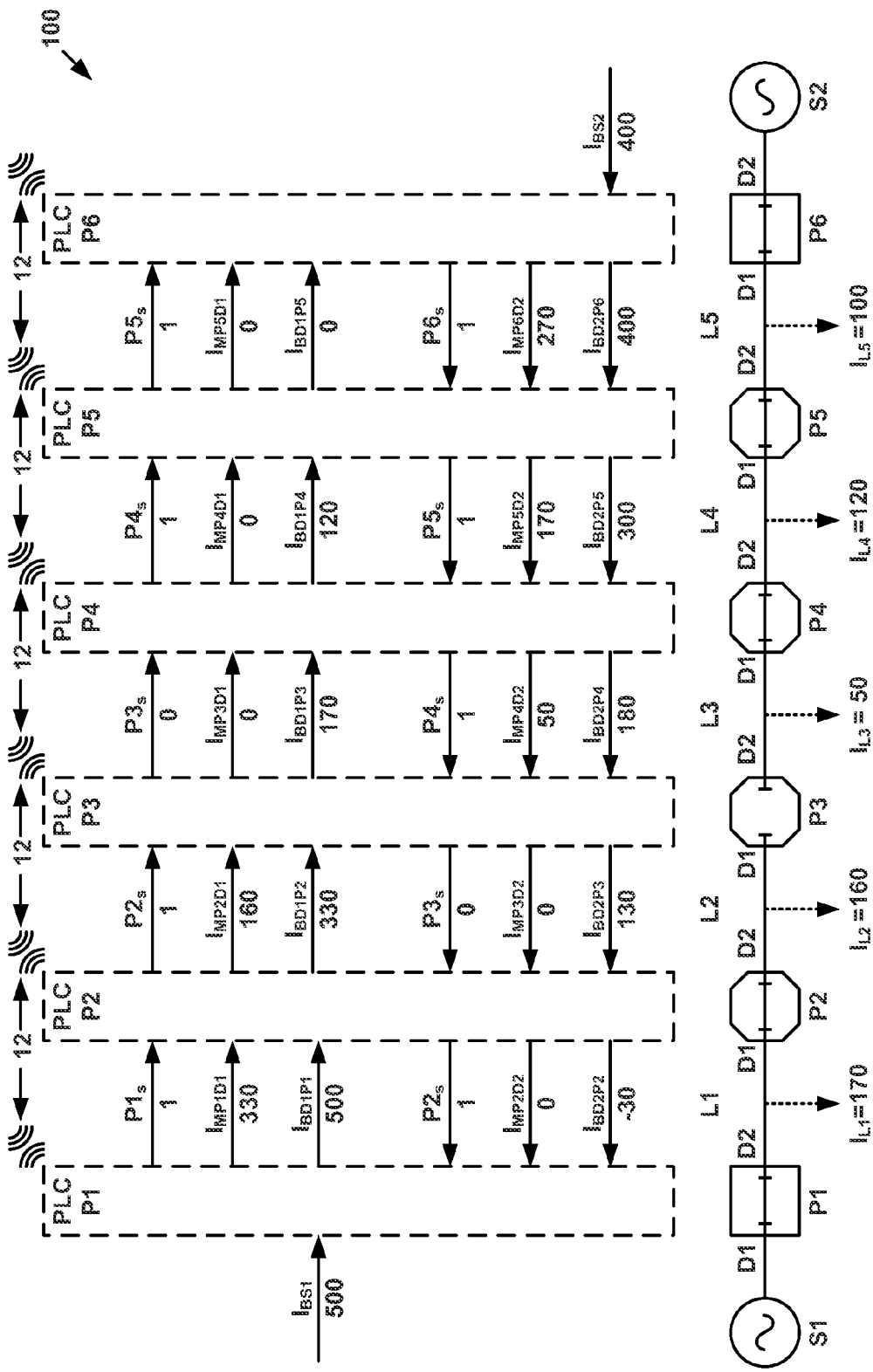
FIG. 2C is a diagram of the example distribution feeder of FIG. 2A at a third time instant.

Because the determined balanced load point P3 is not the same as the open point P4, distribution feeder 100 is not balanced, and the system operator may decide to change the configuration of distribution feeder 100. For example, the system operator may open switch P3 and close switch P4. FIG. 2C illustrates the configuration of distribution feeder 100 at a third time instant t2>t1, in which the open point has been moved from switch P4 to switch P3. Using the techniques described above, the various measured and calculated values are shown on FIG. 2C, and the system is balanced with first source S1 supplying line sections L1-L2, and second source supplying line sections L3-L5.

Figure 2D:
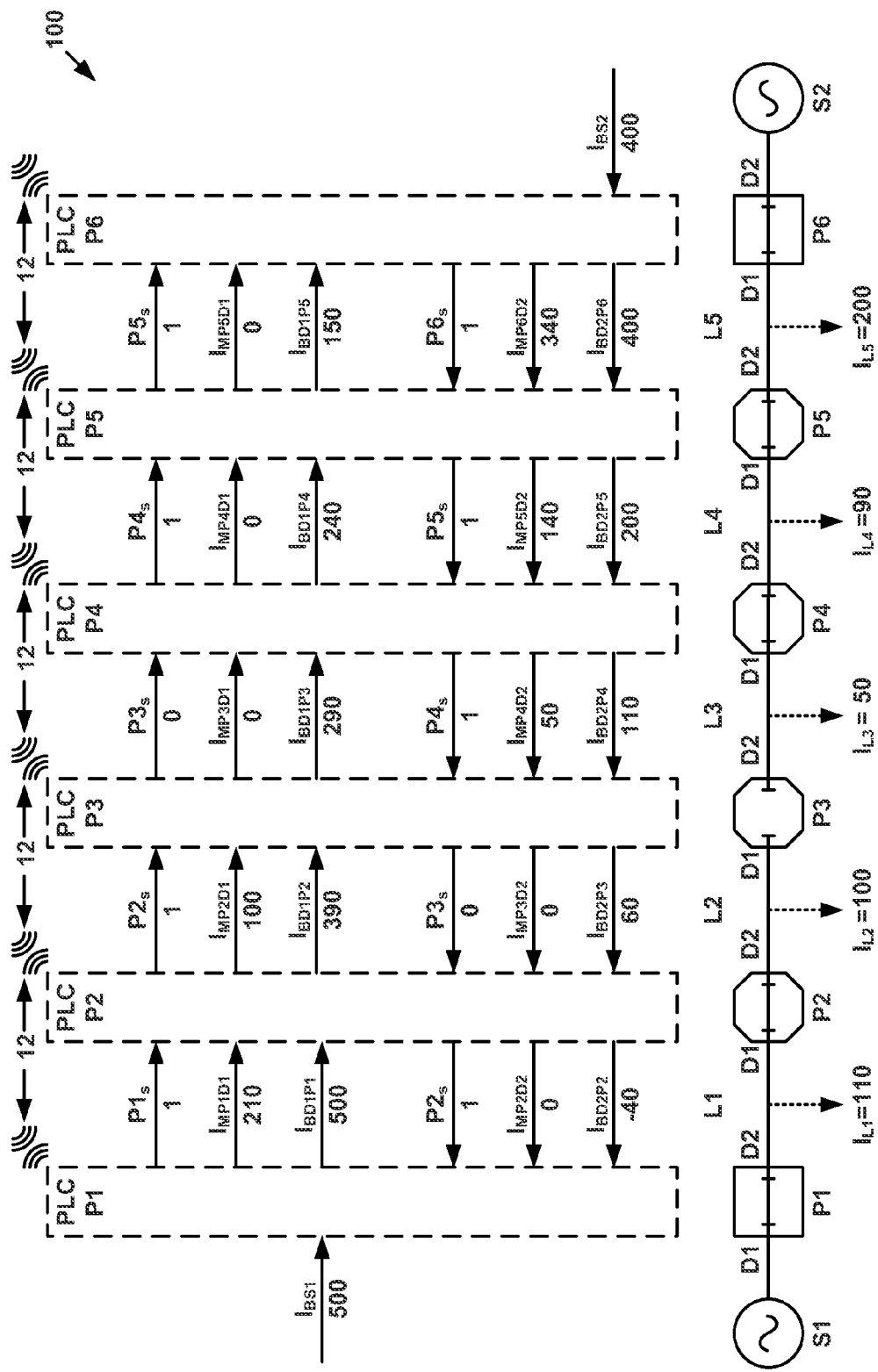
FIG. 2D is a diagram of the example distribution feeder of FIG. 2A at a fourth time instant.

Referring now to FIG. 2D, the configuration of distribution feeder 100 at a fourth time instant t3>t2 is described. In particular, measured real time D1 loads $I_{MP1D1}$ and $I_{MP2D1}$ have decreased to 210 A and 100 A, respectively, measured real time D2 loads $I_{MP5D2}$ and $I_{MP6D2}$ have changed to 140 A and 340 A, respectively, and measured real time D2 load $I_{MP4D2}$ is unchanged.

Following the same techniques described above, peers P1-P5 each measure the real time loads, peers P2-P6 each measure the real time D2 loads, peers P1-P6 calculate the real time line section loads $I_{L1}$-$I_{L5}$, peers P1-P5 each calculate the remaining real time load budget from first source S1 in first direction D1 based on $I_{L1}$-$I_{L5}$, peers P2-P6 each calculate the remaining real time load budget from second source S2 in second direction D2 based on $I_{L1}$-$I_{L5}$, and the peers communicate the measured and calculated values to adjacent peers using GOOSE messages.

As shown in FIG. 2D, the real time line section loads $I_{L1}$ and $I_{L2}$ have decreased to 110 A and 100 A, real time line section load $I_{L4}$ has decreased to 90 A, real time line section load $I_{L5}$ has increased to 200 A, and real time line section load $I_{L3}$ remains the same at 50 A. The remaining real time load budgets in D1 and D2 are:

TABLE 10

Remaining Real Time Load Budgets at t3

| $I_{BD1P1}$ | $I_{BD1P2}$ | $I_{BD1P3}$ | $I_{BD1P4}$ | $I_{BD1P5}$ |
|---|---|---|---|---|
| 500A | 390A | 290A | 240A | 150A |
| $I_{BD2P2}$ | $I_{BD2P3}$ | $I_{BD2P4}$ | $I_{BD2P5}$ | $I_{BD2P6}$ |
| −40A | 60A | 110A | 200A | 400A |

Peers P2-P5 each compares the calculated remaining real time load budgets from first source S1 and second source S2 in first direction D1 to determine which calculated remaining real time load budget is greater, and compares the calculated remaining real time load budgets from first source S1 and second source S2 in second direction D2 to determine which calculated remaining real time load budget is greater. Peer 5 is determined as the balanced load point: the remaining load budget from first source S1 ($I_{BD1P4}$=240 A) exceeds the remaining load budget from second source S2 ($I_{BD2P5}$=200 A) in first direction 1, and the remaining load budget from second source S2 ($I_{B2P6}$=400) exceeds the remaining load budget from first source S1 ($I_{BD1P5}$=150 A) in second direction D2.

Figure 2E:
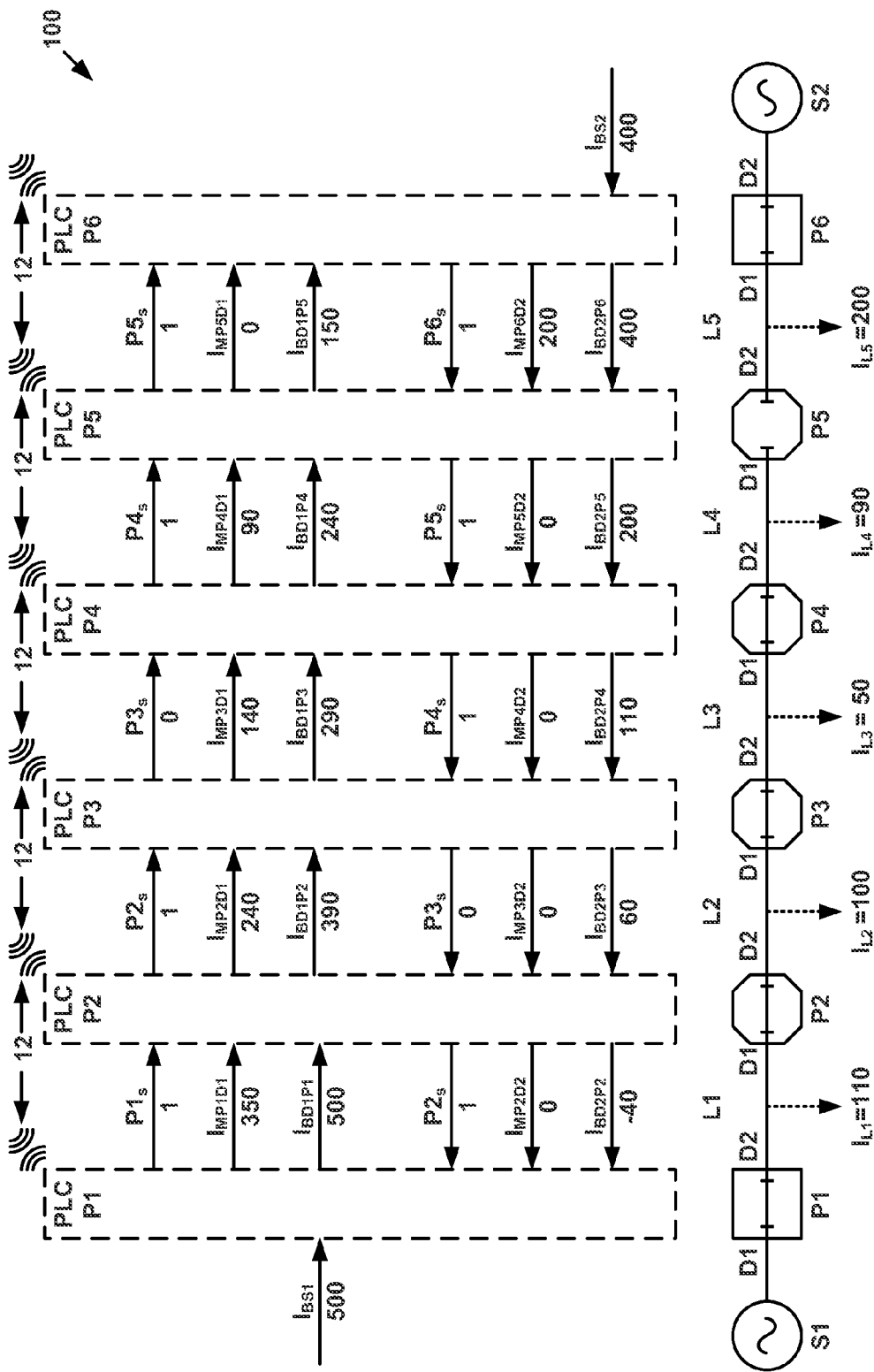
FIG. 2E is a diagram of the example distribution feeder of FIG. 2A at a firth time instant.

Because the determined balanced load point P5 is not the same as the open point P3, distribution feeder 100 is not balanced, and the system operator may decide to change the configuration of distribution feeder 100. For example, the system operator may open switch P5 and close switch P3. FIG. 2E illustrates the configuration of distribution feeder 100 at a fifth time instant t4>t3, in which the open point has been moved from switch P3 to switch P5. Using the techniques described above, the various measured and calculated values are shown on FIG. 2E, and the system is balanced with first source S1 supplying line sections L1-L4, and second source supplying line sections L5.

Permissive Close Determination

Figure 3A:
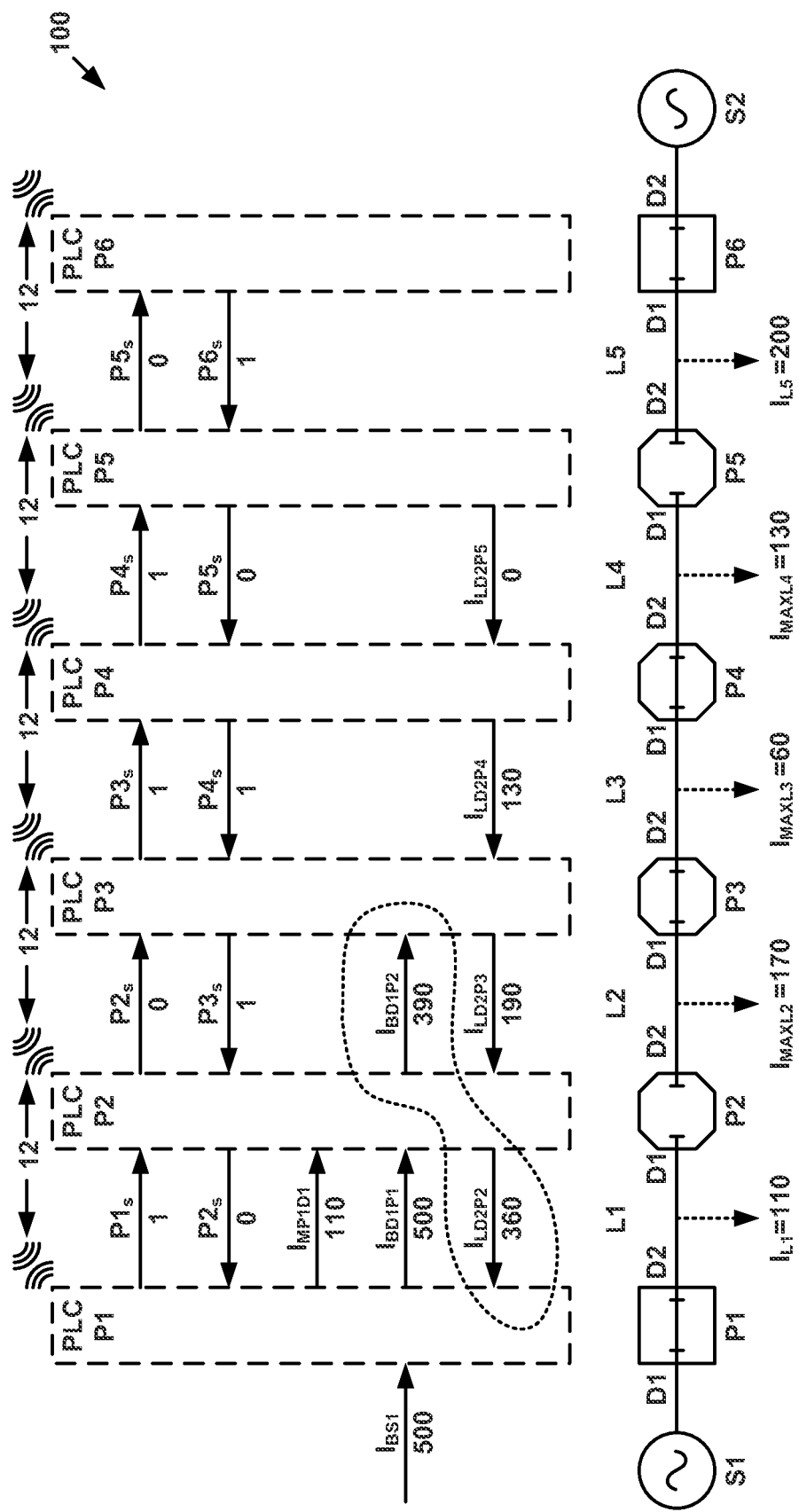
FIGS. 3A-3B are diagrams of another example distribution feeder in accordance with this invention.

As described above, during a system outage (e.g., as a result of a downed power line during a storm, routine repairs, etc.), one or more of first circuit breaker P1, switches P2-P5, and second circuit breaker P6 and may open to disconnect one or more line sections L1-L5 from first source S1 and/or second source S2. For example, FIG. 3A illustrates distribution feeder 100 with switches P2 and P5 open, and first circuit breaker P1, switches P3-P5, and second circuit breaker P6 all closed. Line sections L2-L4 are disconnected from either first source S1 and second source S2.

After the system outage has been remedied, the system operator may want to close open switch P2 or open switch P5 to reconnect disconnected line sections L2-L4 to either first source S1 or second source S2, respectively. To avoid damage that may result from overloading first source S1 or second source S2, the system operator should close switch P2 only if the remaining available load from first source S1 exceeds the load of line sections 12-L14, and should close switch P5 only if the remaining available load from second source S2 exceeds the load of line sections L2-L4.

In accordance with another example embodiment of this invention, peers P1-P6 use a decentralized approach to determine a permissive close signal in distribution feeder 100 by determining substantially real time loading and remaining load budgets at each switching point in distribution feeder 100, and by communicating the measured load and calculated remaining load budgets to adjacent peers in distribution feeder 100, such as by using GOOSE messages or other similar messages.

In particular, for each open point in distribution feeder 100 peers P1-P6 determine a permissive close signal in distribution feeder 100 by: (1) determining the direction (first direction D1 or second direction D2) of the source that will supply power to the reconnected line sections upon closure of the open point, (2) determining a remaining available load budget at the open point from the source in the determined direction, (3) calculating a sum of maximum load current at the open point from all connected devices in the other direction, and (4) issuing a permissive close signal if the determined remaining budget exceeds the calculated maximum load. Each of these will be discussed using open points P2 and P5 in FIGS. 3A and 3B as example.

As shown in FIG. 3A, first source S1 in first direction D1 is the source that will supply power to line sections L2-L4 if switch P2 is closed. Thus, the determined direction is first direction D1. Using the same principles described above with respect to balanced load point determinations, the remaining available budget at switch P2 from first source S1 in first direction D1 is $I_{BD1P2}$=390 A. The maximum load of line sections L2, L3 and L4 are 170 A, 60 A and 130 A, respectively. The maximum loads may be determined based on system specifications for line sections L2-L4. Using the same principles described above with respect to balanced load point determinations, the sum of the maximum load currents at switch P2 from all connected devices in second direction D2 is $I_{LD2P2}$=360 A. Because the remaining load budget in first direction D1, $I_{BD1P2}$=390 A, exceeds the maximum load in second direction D2, $I_{LD2P2}$=360 A, switch P2 issues a permissive close. As a result, if the system operator attempts to close switch P2, the permissive close signal allows switch P2 to close.

Figure 3B:
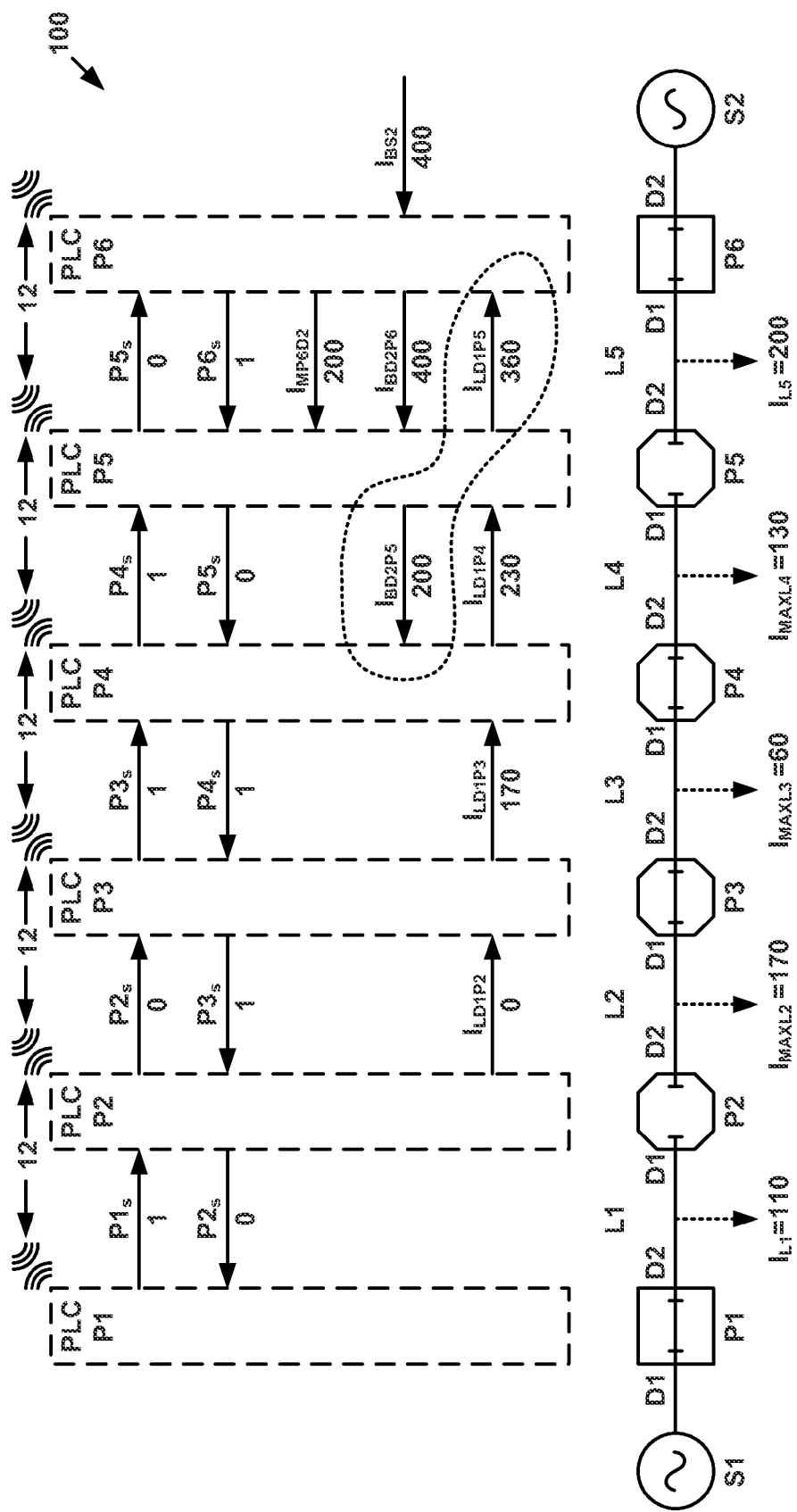

Referring now to FIG. 3B, second source S2 in second direction D2 is the source that will supply power to line sections L2-L4 if switch P5 is closed. Thus, the determined direction is second direction D2. The remaining available budget at switch P5 from second source S2 in second direction D2 is $I_{BD2P5}$=200 A. The sum of the maximum load currents at switch P2 from all connected devices in first direction D2 is $I_{LD1P5}$=360 A. Because the remaining load budget in second direction 2, $I_{BD2P5}$=200 A, does not exceed the maximum load in first direction D1, $I_{LD1P5}$=360 A, switch P5 does not issue a permissive close. As a result, if the system operator attempts to close switch P5, the system will not allow switch P5 to close.

The foregoing merely illustrates the principles of this invention, and various modifications can be made by persons of ordinary skill in the art without departing from the scope and spirit of this invention.

The invention claimed is:

1. A method for use with a distribution feeder that comprises a plurality of switches and a plurality of line sections between adjacent switches, each switch comprising a switching point of the distribution feeder, the method comprising:
   (a) determining a first load in a first direction at a first switch and a second load in the first direction at a second switch coupled to the first switch via a first line section;
   (b) communicating in a second direction the first load and a first load budget from the first switch to the second switch;
   (c) determining a third load on the first line section based on the first load and the second load; and
   (d) determining a second load budget at the second switch based on the first load budget and the third load,
   wherein (a)-(d) are performed substantially in real time.

2. The method of claim 1, further comprising:
   (e) determining a fourth load at the second switch and a fifth load at a third switch coupled to the second switch via a second line section;
   (f) communicating the fifth load and a third load budget from the third switch to the second switch;
   (g) determining a sixth load on the second line section based on the fourth load and the fifth load; and
   (h) determining a fourth load budget at the second switch based on the third load budget and the sixth load,
   wherein (e)-(h) are performed substantially in real time.

3. The method of claim 2, further comprising determining that the second switch is a balanced load point if the first load budget is greater than the fourth load budget and the third load budget is greater than the second load budget.

4. The method of claim 1, wherein the first switch communicates with the second switch using peer-to-peer communication.

5. The method of claim 1, wherein communicating comprises communicating using Generic Object Oriented Substation Event ("GOOSE") messages.

6. The method of claim 1, wherein the first switch communicates with the second switch via a wired or wireless communication network.

7. The method of claim 1, wherein each switch comprises a programmable logic controller.

8. The method of claim 1, wherein the first, the second, or the third load may be a current, a voltage or a power.

9. A method for use with a distribution feeder that comprises a plurality of switches and a plurality of line sections between adjacent switches, each switch comprising a switching point of the distribution feeder, the method comprising:
   (a) determining a first load in a first direction at a first switch;
   (b) communicating in a second direction the first load and a first load budget from the first switch to a second switch coupled to the first switch via a first line section, wherein the second switch is an open point of the distribution feeder;
   (c) determining a second load in the first direction on the first line section based on the first load;
   (d) determining a second load budget at the second switch based on the first load budget and the second load;
   (e) determining a third load in the second direction at a third switch coupled to the second switch via a second line section;
   (f) communicating in the first direction the third load from the third switch to the second switch; and
   (g) determining a fourth load in the second direction at the second switch based on the third load and a maximum load of the second line section,
   wherein (a)-(g) are performed substantially in real time.

10. The method of claim 9, further comprising generating a permissive close signal at the second switch if the second load budget is greater than the fourth load.

11. The method of claim 9, wherein the first switch communicates with the second switch using peer-to-peer communication.

12. The method of claim 9, wherein communicating comprises communicating using Generic Object Oriented Substation Event ("GOOSE") messages.

13. The method of claim 9, wherein the first switch communicates with the second switch via a wired or wireless communication network.

14. The method of claim 9, wherein each switch comprises a programmable logic controller.

15. The method of claim 9, wherein the first, the second, the third, or the fourth load may be a current, a voltage or a power.

16. A distribution feeder that comprises a plurality of switches and a plurality of line sections between adjacent switches, each switch comprising a switching point of the distribution feeder, the distribution feeder further comprising:
   a first switch comprising a first processor; and
   a second switch coupled to the first switch via a first line section, the second switch comprising a second processor;

wherein the first processor is configured to:
  (a) determine a first load in a first direction at the first switch; and
  (b) communicate in a second direction the first load and a first load budget to the second switch;
the second processor is configured to:
  (c) determine a second load in the first direction at the second switch;
  (d) determine a third load on the first line section based on the first load and the second load; and
  (e) determine a second load budget based on the first load budget and the third load;
wherein the first processor performs (a) and (b) substantially in real time; and
wherein the second processor performs (c)-(e) substantially in real time.

17. The distribution feeder of claim 16, further comprising:
a third switch coupled to the second switch via a second line section, the third switch comprising a third processor;
wherein the third processor is configured to:
  (f) determine a fourth load at the third switch; and
  (g) communicate the fourth load and a third load budget to the second switch;
wherein the second processor is further configured to:
  (h) determine a fifth load at the second switch;
  (i) determine a sixth load on the second line section based on the fourth load and the fifth load; and
  (j) determine a fourth load budget based on the third load budget and the sixth load;
wherein the third processor performs (f) and (g) substantially in real time; and
wherein the second processor performs (h)-(j) substantially in real time.

18. The distribution feeder of claim 17, wherein the second processor is further configured to determine that the second switch is a balanced load point if the first load budget is greater than the fourth load budget and the third load budget is greater than the second load budget.

19. The distribution feeder of claim 16, wherein the first processor communicates with the second processor using peer-to-peer communication.

20. The distribution feeder of claim 16, wherein the first processor communicates with the second processor using Generic Object Oriented Substation Event ("GOOSE") messages.

* * * * *